(12) United States Patent
Chamayou

(10) Patent No.: US 8,349,975 B2
(45) Date of Patent: Jan. 8, 2013

(54) METHOD FOR THE PRODUCTION OF POLYMERS

(75) Inventor: Jean-Louis Chamayou, Carry le Rouet (FR)

(73) Assignee: Ineos Europe Limited, Hampshire (GB)

( * ) Notice: Subject to any disclaimer, the term of this patent is extended or adjusted under 35 U.S.C. 154(b) by 93 days.

(21) Appl. No.: 12/737,862

(22) PCT Filed: Sep. 21, 2009

(86) PCT No.: PCT/EP2009/062185
§ 371 (c)(1),
(2), (4) Date: Feb. 24, 2011

(87) PCT Pub. No.: WO2010/037652
PCT Pub. Date: Apr. 8, 2010

(65) Prior Publication Data
US 2011/0152477 A1    Jun. 23, 2011

(30) Foreign Application Priority Data
Oct. 3, 2008  (EP) .................................... 08165828

(51) Int. Cl.
C08F 2/00     (2006.01)
C08F 210/00   (2006.01)
C08F 10/14    (2006.01)
C08F 10/04    (2006.01)
C08F 110/06   (2006.01)
C08F 110/02   (2006.01)

(52) U.S. Cl. .......... 526/71; 526/348; 526/351; 526/352; 526/348.6; 526/348.2; 526/348.4

(58) Field of Classification Search .................... 526/71, 526/348, 351, 352, 348.6, 348.2, 348.4
See application file for complete search history.

(56) References Cited

U.S. PATENT DOCUMENTS

| 4,372,758 A | 2/1983 | Bobst et al. |
| 5,376,742 A | 12/1994 | Krause |

FOREIGN PATENT DOCUMENTS

| EP | 0 127 253 A1 | 12/1984 |
| EP | 0 457 603 A1 | 11/1991 |
| EP | 0 596 434 A1 | 5/1994 |
| EP | 0 683 176 A1 | 11/1995 |
| EP | 0 855 411 A1 | 7/1998 |
| EP | 1 484 344 A2 | 11/1999 |
| EP | 1 240 217 | 9/2002 |
| WO | WO 03/011920 A1 | 2/2003 |
| WO | WO 2005/003188 A1 | 1/2005 |
| WO | WO 2005/003318 A2 | 1/2005 |
| WO | WO 2005/007712 A1 | 1/2005 |
| WO | WO 2008/024517 A | 2/2008 |
| WO | WO 2008/024517 A2 * | 2/2008 |
| WO | WO 2008/043473 A1 | 4/2008 |

OTHER PUBLICATIONS

"Pressure Swing Adsorption Recovery System"; *U.S. Department of Energy*, 4 pgs (2003).

* cited by examiner

Primary Examiner — William Cheung
(74) Attorney, Agent, or Firm — Nixon & Vanderhye

(57) ABSTRACT

Method for transitioning from a first process for producing a first polymer to a second process for producing a second polymer. The first and second processes each include contacting a principal olefin and a comonomer with a catalyst under gas phase polymerization conditions to form the first or second polymer. The first and second processes utilize the same olefin but differ in at least one of the comonomer used and the reaction temperature at which the polymer is produced. The respective first or second polymer is then contacted with a purge gas to remove unreacted monomers. The method includes changing the flow rate of purge gas from a first rate to a second rate defined relative to a flow rate and temperature used for an earlier polymer produced using the same comonomer as the second process.

12 Claims, No Drawings

METHOD FOR THE PRODUCTION OF POLYMERS

This application is the U.S. national phase of International Application No. PCT/EP2009/062185 filed 21 Sep. 2009 which designated the U.S. and claims priority to European Application No. 08165828.8 filed 3 Oct. 2008, the entire contents of each of which are hereby incorporated by reference.

The present invention relates to methods useful for the production of polymers.

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins, for example, the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

The polymer product removed from the reactor may contain unreacted monomers and other hydrocarbon species (for example, hydrogen, ethane, methane, propane, pentane, hexane, butane) and these monomers and other hydrocarbons should be removed from the polymer product since failure to do so may lead to (a) hydrocarbons levels rising to explosive levels in downstream equipment or (b) environmental constraints being exceeded.

One step that is typically used is to contact the produced polymer with a gas in a purge vessel, usually a countercurrently flowing inert gas, such as nitrogen, to remove entrained monomers and other hydrocarbons. Said step may be referred to as "purging" or "degassing".

There are a number of prior art patents which describe methods for the removal of such hydrocarbons from the products of gas phase and slurry processes including such a step, such as U.S. Pat. No. 4,372,758, EP 127253, EP 683176, EP 596434, U.S. Pat. No. 5,376,742 and WO 2005/003318.

U.S. Pat. No. 4,372,758, for example, describes a degassing process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

A number of factors affect the rate at which the residual monomers and other components that might be present are removed. U.S. Pat. No. 4,372,758 describes a number of these, including temperature and pressure in the purge vessel, resin particle size and morphology, monomer concentration in the resin, purge gas composition (monomer content) and purge gas flow rate, but there are also others. These factors determine the required residence time in the purge vessel in order for the residual monomer level in the polymer to be reduced to safe levels prior to further downstream treatment, but although the requirements can be determined experimentally or by past process experience for any particular polymer, the relationships are generally complex.

In general, despite the above, it is still difficult to remove all residual hydrocarbons in an economic manner. Thus, whilst purge gas rates, purge gas purity (level of hydrocarbons already present), temperature and residence times in the degassing step may all, in theory, be increased to give complete hydrocarbon removal for any particular polymer, the costs associated with such steps mean that it is conventional that small amounts of hydrocarbons remain in the polymer even after degassing, and storage silos are normally purged to prevent build-up of hydrocarbon vapours degassing with time from the stored polymer.

Further, in operation of a commercial polymerisation process it is typical to produce a sequence of different polymers by variation of reaction conditions, such as temperature or comonomer used with time (known as "transitioning") without having to shut-down the reactor, this being a so-called "polymerisation campaign". Although the degassing may be well optimised for some of the polymer products that might be made, degassing processes are often designed to be relatively inflexible in operation for degassing of other polymer products, with more or less reliance made on the subsequent storage purge to deal with the residual hydrocarbons rather than variation in degassing conditions.

More recently, WO 2008/024517 has described a method and apparatus for managing volatile organic content of polyolefins. In this disclosure a purge column model is described which is based on mass transfer theory, and which is used to control the degassing process such that the purge rates may be varied dependent on the polymer to be degassed.

However, such a process is relatively complicated, and is only as accurate as the model on which it is based. For example, it has been found that models based on mass transfer theory do not accurately represent the degassing process. In particular, it has been found experimentally that the actual diffusion rates between the solid and the gas phases are not the same as used for a mass transfer model as described in WO 2008/024517, which reduces the accuracy of such models.

Further, even with an "accurate" model, it is incredibly complicated to incorporate such a model into a process control system. In particular, where the purge rate is to be varied based on a model output, the corresponding safety interlocks in the process, which must also be based on the model output, must be set to levels which allow for all the possible variability of the individual parameters of the model. However, the difficulty of doing this whilst continuing to "guarantee" safe operation increases with the complexity of the model. Because of these safety considerations, application of such models to "real" systems in which the purge rates in the degassing column are varied based on a model output still results in operation where the degassing process operates far from the "optimum" values taught by the model and with a much reduced variability than might otherwise be expected.

In contrast, it has now been found that, when transitioning from the production of a first polymer to production of a second polymer under gas phase polymerisation conditions, the change in conditions for the degassing process for the second polymer can be relatively simply controlled based on the degassing conditions during an earlier polymer production.

Thus, in a first aspect, the present invention provides a method for transitioning from a first process for production of a first polymer to a second process for the production of a second polymer during a polymerisation campaign in a polymerisation apparatus, said polymerisation apparatus comprising a reaction vessel and a degassing vessel, in which the respective first and second processes each comprise:

(a) bringing a principal olefin and a comonomer into contact with a catalyst under gas phase polymerisation conditions in the reaction vessel to form the respective first or second polymer, wherein said first and second process utilise the same principal olefin but differ in at least one of (i) the comonomer used and (ii) the reaction temperature at which the polymer is produced, and (b) subsequently contacting the respective first or second polymer with a purge gas in the degassing vessel to remove unreacted monomers, characterised in that the method for transitioning comprises changing the flow rate of purge gas in the degassing vessel from a first rate, $X_1$, used for degassing of the first polymer to a second rate, $X_2$, used for degassing of the second polymer, the second rate being defined relative to the flow rate, $X_i$, and temperature, $T_i$, used for an earlier polymer produced during the campaign using the same comonomer as the second process, and the reaction temperature, $T_2$ in the second process, and that a. where $T_2$ is increased relative to $T_i$, $X_2$ is at least 1% lower than $X_i$ for each 1° C. increase in $T_2$ compared to $T_i$, b. where $T_2$ is decreased relative to $T_i$, $X_2$ is at least 1% higher than $X_i$ for each 1° C. decrease in $T_2$ compared to $T_i$, and c. where $T_2$ is equal to $T_i$, $X_2$ is at least equal to $X_i$, preferably equal to $X_i$.

In the method of the present invention, the flow rate of the degassing process for the second polymer is controlled based on the degassing of an earlier polymer which is produced during the campaign using the same principal olefin and comonomer, and the temperature difference in the respective processes in which they are produced.

In particular, within a polymerisation campaign it is usual to produce a number of different polymer products. Over the course of a campaign the catalyst "type" and the principal olefin are likely to be "fixed" but it may be desirable to produce a number of polymers using different comonomers and a number of different polymer using a common comonomer, but with varying polymer properties, such as melt index and density. The latter generally requires changes in the reactor temperature, and usually also changes in the relative ratio of the comonomer to monomer in the polymerisation process.

Thus, transitions can, among others, be envisaged in which:

(1) the same comonomer is kept, but the temperature is changed and possibly the amount of comonomer in the reactor, (2) the comonomer is changed, optionally also with changing of the temperature.

The method of the present ensures that degassing operation remains within a relatively narrow window in which the safety requirements for the second polymer are met but excessive amounts of purge gas are not used over and above that required for safe operation. The present invention achieves this by referring back to an earlier degassing flow rate used for production of a polymer using the same comonomer as the second process to which the polymerisation is being transitioned, rather than the immediately preceding polymer, and such that any significant changes in temperature in operation compared to said earlier process result in a change in degassing flow rate.

Generally, the safety settings for the process, for example the minimum purge gas flow rate below which the process is not allowed to operate, will also be changed with each change in purge gas flow rate. Because the relationships for the model used to vary the purge rates are so simple, the corresponding settings for the safety interlocks in the process may also be varied in a corresponding (and simple) manner. The full benefit of the calculated changes in purge gas flow rate for the polymer to be degassed from the equations of the present invention can therefore be utilised.

It is, in theory, possible to change the degassing flow rate for a new polymer being produced to one based on the immediately preceding polymer, and then base the subsequent transition on said polymer and so on. However, using such a system it is possible to transition from a first polymer produced at a reaction temperature $T_1$ to an increased temperature $T_2$, and then transition back the first polymer or another polymer also produced at the temperature $T_1$ and not return to at least the original flow rate unless further restrictions are applied to the allowable flow rates. In general this requires either a more accurate calculation of the degassing flow rate required for the polymer after each and every transition, or the safety margins required must be expanded to account for any potential differences over time. The result is that, to ensure safe operation, over a number of transitions the operator ends up using a much higher flow rate than is actually required. Thus, in the present invention reference to an earlier polymer, which is other than the first polymer for a particular transition, is used.

In the present invention relatively simple control of the degassing flow rate of the subsequent polymers (second polymers) can be achieved by always referring back to the degassing conditions for an earlier polymer produced using the same co-monomer. This provides a much higher level of simplification of the calculation of suitable flow rate for a particular second polymer, with a suitable margin for error, but always within a reasonable range compared to the value that would be calculated if a more complicated calculation were used.

Thus, once the earlier operation has been selected by the operator to provide sufficient (safe) degassing for the particular earlier polymer, referring back to this earlier operation for all subsequent polymers made with the same comonomer ensures preferred degassing operation even after a large number of transitions.

The same "earlier polymer" may be used as the reference for all subsequent transitions to second processes using the same comonomer. Usually, the "earlier polymer" will be the first made in a particular campaign using the same comonomer as the second process, and there will be different "earlier polymers" for each comonomer used in a campaign.

The method of the present invention has the advantage that once the values $X_i$ and $T_i$ for the earlier polymers are set for each comonomer to be used in the campaign, the subsequent flow rates, $X_2$, for other polymers to be produced may be easily determined based on these values and the temperature $T_2$.

This provides a much simpler polymerisation process than independently calculating degassing conditions for each individual polymer to be produced during a campaign, for example in a similar manner to WO 2008/024517.

Without wishing to be bound by theory, when the comonomer is the same for two different polymers being produced, a number of the variables which might affect the degassing process do not change, or the changes e.g. monomer concentration, will not have a significant effect on the degassing requirements. It has been found that, once the degassing flow rate for an earlier polymer product has been set, the degassing flow rate for the subsequent polymer products using the same comonomer can be simply determined relative to this and based on the relative temperatures of the earlier polymer production and the subsequent polymer production.

In particular, once the degassing rate $X_i$ is determined, it is not necessary to include any other parameters in the calculation of the new flow rate, $X_2$. Thus, for avoidance of doubt the present invention does not use any model based on theories which attempt to define the rate of volatiles removal from the polymer particles, such as mass transfer theory or equilibrium theory. Preferably, the value of $X_2$ is solely calculated based on $X_i$, $T_i$ and $T_2$ as defined herein.

It is an important advantage of the method of the present invention that very simple relationships between the degassing rate required for the second polymer and the degassing rate of the earlier polymer may be used.

Thus, in the present invention, the degassing flow rate in said second process is as follows:
a. where $T_2$ is increased relative to $T_i$, $X_2$ is at least 1% lower than $X_i$ for each 1° C. increase in $T_2$ compared to $T_i$,
b. where $T_2$ is decreased relative to $T_i$, $X_2$ is at least 1% higher than $X_i$ for each 1° C. decrease in $T_2$ compared to $T_i$, and
c. where $T_2$ is equal to $T_i$, $X_2$ is at least equal to $X_i$, preferably equal to $X_i$.

This is possible because, in a general gas phase polymerisation process, and hence in the method of the present invention, minimal, and preferably no, specific heating or cooling is applied to control the temperature of the polymer product removed from the reactor vessel prior to the degassing vessel, and thus the temperature of the polymer entering the degassing vessel is directly related to the temperature at which it is formed in the reaction vessel.

In comparison, in a slurry phase process such as described in WO 2008/024517, it is conventional that the slurry removed from the reactor is heated and passed to one or more flash vessels, in which the majority of the liquid medium is removed, prior to purging. Reference may be made, for example, to FIGS. 5 and 17 of WO 2008/024517.

In the present invention, where the reaction temperature is increased in the second process compared to the earlier process, the flow rate of purge gas in the second process can be reduced compared to the earlier process. In particular, where $T_2$ is increased relative to $T_i$, $X_2$ is at least 1% lower than $X_i$ for each 1° C. increase in $T_2$ compared to $T_i$.

Clearly the flow rate, $X_2$, whilst it can be reduced relative to $X_i$, should not be reduced excessively (unless for some reason the original flow rate, $X_i$, is significantly above the required minimum flow rate for the original polymer). Preferably, $X_2$ is no more than 3% lower than $X_i$ for each 1° C. increase in temperature in $T_2$ compared to $T_i$, and most preferably $X_2$ is reduced relative to $X_i$ by an amount of 2% to 3% for each 1° C. increase in $T_2$ compared to $T_i$.

In contrast, where the reaction temperature is decreased in the second process compared to the earlier process, the flow rate of purge gas in the second process is increased compared to the earlier process. In particular, where $T_2$ is decreased relative to $T_i$, $X_2$ is at least 1% higher than $X_i$ for each 1° C. decrease in $T_2$ compared to $T_i$. In this case, increasing the flow rate significantly more than this minimum does not cause any safety concerns, but there is a cost of doing so. Preferably, $X_2$ is increased by less than 10% compared to $X_i$ for each 1° C. decrease in temperature in $T_2$ compared to $T_i$, and most preferably is increased by an amount of 3% to 5% for each 1° C. decrease in $T_2$ compared to $T_i$.

Finally, where $T_2$ is equal to $T_i$, $X_2$ is at least equal to $X_i$. Again, in this case, increasing the flow rate significantly more than this minimum does not cause any safety concerns, but there is a cost of doing so. Preferably, in this case the flow rate $X_2$ is less than 5% greater than $X_i$, more preferably in the range 0% to 2% greater than $X_i$, and most preferably equal to $X_i$. It can be noted that there could be a differential in the relative increases and decreases in the flow rates when temperature changes. In particular, caution exercised when decreasing temperature (relative to $T_i$) favours increasing flow rates more than may be necessary, whereas when increasing temperature caution favours not decreasing the flow rates excessively.

Since the degassing/purge gas flow rate, $X_2$, is defined relative to an earlier rate $X_i$, the units used are not critical. Nevertheless it is convenient to use mass flow rates of purge gas entering the degassing vessel. The purge gas mass flow rate can be measured using a suitable flow meter through which the purge gas is passed prior to the degassing step.

In one embodiment of the present invention, each polymer produced during a campaign will have a degassing flow rate defined based on its actual production temperature (and the comonomer used). In such a scenario every change in reaction temperature results in a change in the flow rate in the degassing step to correspond to the required flow rate for the second polymer being transitioned to.

However, in an overall campaign it is not necessary for every temperature change from $T_1$ to $T_2$ to result in a degassing flow rate change according to the method of the present invention. In particular, although it is possible to change the flow rate for every change in temperature from $T_1$ to $T_2$ at which the first and second polymers are produced, even if the temperature difference is relatively small, as in the first embodiment, for practical operational purposes it may be deemed unnecessary to change the degassing flow rate if only small changes in temperature are made. Thus, the flow rate may not changed, even though the reaction temperature changes, unless the temperature differential between $T_1$ and $T_2$ is more than a defined value, for example 5° C.

To ensure that the safety requirements of the degassing process are still met, $X_2$, and hence $X_1$, should still meet the requirements relative to $X_i$ of the relevant criteria a, b or c as defined herein. In this scenario changing the degassing flow rate is not necessary.

In a particularly preferred embodiment, it is convenient to define temperature bands, for example of 10° C. or 5° C., where the purge rate is not changed for transitions between products produced within a particular temperature band, the purge rate only being changed when a transition occurs to a temperature, $T_2$ in another band to that of $T_1$.

Generally, the narrower the bands in such an embodiment the more optimum is the degassing over a range of products, so a range of 5° C. or less is preferred for each band. As specific examples, the defined bands may be 70-75° C., 75-80° C., 80-85° C., 85-90° C., 90-95° C. etc, although it will be readily apparent that other bands of width of 5° C. may be equally valid. Equally there is no necessity for the temperature bands to be a uniform range, e.g. 5° C., across the full operational window of polymer production. For example, a band of 5° C. may be used at "lower" temperatures, and a wider band, of e.g. 10° C., may be used at "higher temperatures".

In this embodiment, the flow rate in each band will usually be based on the lowest temperature operation in each band, since this requires the highest degassing flow rate.

In general, transitions in which the comonomer is not changed are also significantly less complicated that those in which the comonomer is changed, and thus it is often desirable, within an overall polymerisation campaign, to produce a number of polymers using the same comonomer in one sequence, before transitioning to polymers produced using a different comonomer, and producing a number of these in sequence.

In this embodiment, a sequence of polymers may be produced using the same comonomer and with varying reaction temperatures, and the flow rate in the second process may be determined based solely on the relative changes in temperatures in the second process compared to a common earlier process At some stage however, it is generally desired to make a transition in which the comonomer is changed. In the method of the present invention, this will result in a change in the earlier polymer which is referenced to determine the flow rate, $X_2$, required for the second polymer. Otherwise, however, the same relationships apply. Thus, transitions in which the comonomer is changed, optionally at the same time as temperature, can also be easily accommodated in the present invention.

The present invention takes place in a polymerisation apparatus comprising a reaction vessel and a degassing vessel.

In the reaction vessel and for each polymer a principal olefin and a comonomer are brought into contact with a catalyst under gas phase polymerisation conditions to form the respective first or second polymer.

The reaction vessel may be any suitable reaction vessel suitable for operation of a gas phase polymerisation reaction. Preferably, each reaction is carried out continuously in a gas phase fluidised-bed reactor. Such reactors and their operation are well-known, and examples include EP 0 475 603, EP 1 240 217, EP 1 484 344 and EP 0 855 411.

Two or more reaction vessels which are used sequentially to produce a final polymer product may be present in a commercial polymerisation process. One example of such processes is the production of bimodal polyethylenes using two reactors operating under different conditions. In such scenarios, the reaction vessel of step (a) of the present invention is the last reaction vessel in the sequence. For avoidance of any doubt, the earlier vessels in the sequence may be gas phase, especially fluidised bed, processes for production of polymers, but need not be and may, for example, be slurry phase processes.

In fluidised bed processes, the particles of polymer being formed are maintained in the fluidised state by virtue of a reaction gas mixture containing the monomers to be polymerized travelling in a rising stream. The polymer thus manufactured in powder form is generally drained from the reactor in order to keep the bed of fluidised polymer particles at a more or less constant volume. The process generally employs a fluidization grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidization grid by means of an external circulation conduit.

The polymerisation of the olefins is an exothermic reaction. The reaction mixture comprising the olefins to be polymerized is generally cooled by means of at least one heat exchanger arranged on the outside of the reactor before being recycled.

The reaction mixture may also comprise one or more inert compounds, especially inert gases such as nitrogen, and/or one or more saturated hydrocarbons such as ethane, propane, butane, pentane and hexane. One or more compounds may be injected into the reaction zone in liquid form. Vaporisation of the liquid in the reaction zone provides the effect of cooling directly in the reaction zone. Generally, and preferably, where such inert/liquid compounds are present for one polymer the same compound(s) is/are present/used for other polymers to be produced during a polymerisation campaign, although the amount of such compounds present may be varied for different polymers to be produced. For example, where pentane is injected into the reactor in liquid form for one polymer it will usually also be used for other polymers rather than changing to another saturated hydrocarbon, not least because this is clearly more convenient than changing the hydrocarbon used.

The polymerisation is suitably carried out in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

"Principal olefin", as used herein, means the olefin which is incorporated into the produced polymer in the greatest amount (by weight). Usually this will also be the olefin present in the reaction mixture in the greatest amount and which is provided to the reaction mixture in the greatest amount.

"Comonomer", as used herein, means an olefinic reagent other than the principal olefin, and which is desired to be incorporated in the polymer product.

The principal olefin is preferably selected from ethylene and propylene.

The comonomer olefin is preferably selected from olefins having 2 to 12 carbon atoms (other than the principal olefin). Suitable comonomer olefins are ethylene, propylene, 1-butene, 1-hexene, 4-methyl-1-pentene and 1-octene. More preferably, the comonomer is selected from 1-butene, 1-hexene or 1-octene.

Most preferably, the olefin is ethylene and the comonomer is 1-butene, 1-hexene or 1-octene, especially 1-hexene or 1-octene.

More than one comonomer may be present in the earlier, first or second polymerisation process, although preferably only one comonomer is present in each.

The product polymer removed from the reaction vessel is passed to a degassing vessel wherein it is contacted with a purge gas to remove unreacted monomers (principal olefin and comonomer(s)).

The temperature, T, in the degassing step is typically in the range 50-110° C. As used herein, this temperature is defined as the powder temperature measured at the outlet to the degassing step.

The pressure, Ptot, in the degassing step is typically in the range 0 to 1 barg (100 to 200 kPa).

The degassing vessel of the present invention may be one of two or more degassing vessels in which contacting with a purge gas to remove volatile hydrocarbons occurs. The purge vessel may also consist of a "combined degasser" in which two or more degassing stages are present in a single degassing column.

Thus, two or more stages may be present in which different purge gases are contacted with the polymer powder. It is a requirement of the present invention that the flow rate of purge gas in at least one degassing vessel is varied as claimed.

The purge gas may be recycle purge gas or an inert gas, or may comprise a mixture thereof. A particularly preferred inert gas is nitrogen. "Recycle purge gas", as defined herein, is purge gas removed from the outlet of the relevant degassing vessel or another degassing vessel, if present, and passed to the inlet of the degassing vessel, optionally after treatment to remove degassed hydrocarbons.

In a preferred embodiment of the present invention, the degassing vessel in which the flow rate of purge gas is varied as defined herein, is the first of two degassing vessels. Preferably, the purge gas to said first degassing vessel ("first purge gas") comprises at least a portion of recycle purge gas recycled from the outlet of said first degassing vessel. Prior to recycle, said stream is preferably treated to remove at least some of the degassed hydrocarbons therefrom.

A second purge gas is provided to the second, subsequent, degassing vessel. Most preferably, the second purge gas is an inert gas, especially nitrogen. The flow rate of said second purge gas may be constant or may also be varied with polymer product.

The catalyst used in production of the earlier polymer, the first polymer (where not the earlier polymer) and second polymer is of the same "type". "Catalyst type" as used herein refers to the common classes used to distinguish polymerisation catalyst systems, and combinations thereof. Thus, "metallocene", "Ziegler" (or "Ziegler-Natta") and "Phillips" (or "chromium") catalysts are all "types" of catalyst according to the present invention. In addition, "mixed catalysts" comprising two or more of these e.g. a mixture of metallocene catalysts or a mixed metallocene/Ziegler catalyst system, are also considered as catalyst "types" for the method of the present invention.

In general, significant variations, even within the above "types" of catalyst are not common within a particular polymerisation campaign. Thus, the catalyst used in production of the earlier polymer, the first polymer (where not the earlier polymer) and second polymer is likely to be the same or similar even within these general "types". By "similar" is meant within the same catalyst family. A catalyst family may be characterised by the fact that the catalysts therein are of the same type and produce powders with similar physical properties vis à vis absorption/desorption of comonomers For example, metallocene catalysts within a catalyst family are likely to be based on the same active metal and ligands. Similarly, similar or the same activators or other catalyst additives are likely to be used throughout large parts of a campaign.

Most preferably, the same catalyst is used for production of the earlier polymer, the first polymer (where not the earlier polymer) and second polymer.

Generally, when the comonomer is not changed during a transition, the amount of the comonomer, in particular the amount of comonomer relative to the principal olefin is usually changed for the transition. This change is generally reflected by the polymerisation temperature change, and therefore accounted for in the dependency of $X_2$ on $T_2$.

The amount of other reactants, for example hydrogen, may also be changed as may be required for the transition. In general, changes in such components do not have any significant influence on the subsequent degassing.

The reaction pressure is usually approximately constant before and after the transition.

As described above, in one embodiment of the first aspect of the invention, the polymers to be produced may be grouped into temperature bands, for example of 10° C. or 5° C., within with all polymers will be degassed using the same purge rate. This principal can also be applied generally to the polymerisation campaign such that particular degassing rates are applied for each band.

In a second aspect, therefore, the present invention provides a method for production of three or more polymers during a polymerisation campaign in a polymerisation apparatus, said polymerisation apparatus comprising a reaction vessel and a degassing vessel, and said method comprising:
  (a) producing a first polymer,
  (b) transitioning from production of said first polymer to production of a second polymer,
  (c) producing said second polymer,
  (d) transitioning from production of said second polymer to production of a third polymer,
  (e) producing said third polymer,
  (f) repeating said steps as required to transition to and produce any further polymers to be produced,
each polymer being produced by bringing a principal olefin and a comonomer into contact with a catalyst under gas phase polymerisation conditions in the reaction vessel to form the said polymer, and said polymer being subsequently contacted with a purge gas in the degassing vessel to remove unreacted monomers,
  wherein the production of all said polymers uses the same principal olefin but for each transition at least one of (i) the comonomer used and (ii) the reaction temperature at which the polymer is produced is changed, with the further proviso that in at least one transition the comonomer used is changed and in at least one transition the reaction temperature is changed,
  and characterised in that:
    for each comonomer to be used in the polymerisation campaign, two or more bands covering a range of temperatures within the total range of temperature used to produce the polymers using said comonomer are defined, each of the three or more polymers to be produced during the campaign being produced at a temperature which falls within one of the defined bands for the relevant comonomer and each band having associated with it a flow rate for purge gas in the degassing vessel,
    wherein, during production of each polymer to be produced, the flow rate of purge gas in the degassing vessel is at least equal to the flow rate associated with the band within which said polymer falls, and
    unless the transition is from one polymer to another polymer within the same band, during each transition the flow rate in the degassing vessel is changed to a flow rate at least equal to the flow rate associated with the band within which the polymer being transitioned to falls.

The second aspect of the present invention provides a number of bands with associated flow rates of purge gas for the degassing vessel, based on the temperature of the polymer production and the comonomer used. There are at least two bands for each comonomer to be used during the campaign, and since at least two comonomers are used (there must be a comonomer transition) at least 4 bands are defined in total.

Preferably, the full range of possible reaction temperatures for each comonomer to be used is split into consecutive, non-overlapping bands, each with an associated flow rate for the purge gas in the degassing vessel. A typical range of reaction temperatures could be 70° C. to 120° C., or wider, and typically, for each comonomer, there are least 5 bands each covering a temperature range of 10° C. or less.

The bands may be suitably presented or represented in a Table or matrix with the comonomer on one side and the temperature bands on the other in a general form as shown below in table 1a, and as a more specific example in Table 1b:

TABLE 1a

| Temperature band | Comonomer | | |
| --- | --- | --- | --- |
| | A | B | C |
| a-<b ° C. | X1 | Y1 | Z1 |
| b-<c ° C. | X2 | Y2 | Z2 |
| c-<d ° C. | X3 | Y3 | Z3 |
| d-<e ° C. | X4 | Y4 | Z4 |
| Etc. | ... | ... | ... |

TABLE 1b

| Temperature band | Comonomer | | |
| --- | --- | --- | --- |
| | 1-butene | 1-hexene | 1-octene |
| 70-<80° C. | X1 | Y1 | Z1 |
| 80-<90° C. | X2 | Y2 | Z2 |
| 90-<100° C. | X3 | Y3 | Z3 |
| 100-<110° C. | X4 | Y4 | Z4 |
| Etc. | ... | ... | ... |

In the above Tables, the values X1, X2, Y1, Y2 etc. each represent a flow rate of purge gas in the degassing vessel for a polymer to be produced using the relevant comonomer and in the relevant temperature band, such that during production of each polymer the flow rate of purge gas in the degassing vessel is at least equal to the associated flow rate. Thus, with reference to Table 1b above, for production of a polymer of the principal olefin and 1-hexene at 85° C., a flow rate at least equal to Y2 is used.

Unless the transition is from one polymer to another polymer within the same band, during each transition the flow rate in the degassing vessel is changed to a flow rate at least equal to the flow rate associated with the band within which the polymer being transitioned to falls. Again, with reference to Table 1b above, for transition from a polymer of the principal olefin and 1-hexene at 85° C. to a polymer of the same principal olefin and 1-hexene at 95° C., the flow rate is changed from a flow rate at least equal to Y2 to a flow rate at least equal to Y3. For a transition from a polymer of the principal olefin and 1-hexene at 85° C. to a polymer of the same principal olefin and 1-octene at 85° C., the flow rate is changed from a flow rate at least equal to Y2 to a flow rate at least equal to Z2.

The values X1, X2, etc., are selected as the minimum degassing flow rate to provide the required (safe) degassing rate across the temperature band for said particular comonomer and temperature band. The flow rate in each band will usually be based on the lowest temperature operation in each band, since this requires the highest degassing flow rate.

In general, it is desired to operate with a flow rate of purge gas in the degassing vessel at the associated value for a particular polymer (i.e. X1, X2 etc.) or close thereto, by which is meant with less than a 10% increase compared thereto, since any additional flow rate is extra cost with no economic benefit. Each Table is specific for a particular principal olefin e.g. ethylene, but this is not generally changed in a particular process.

As with the first aspect of the present invention, and again without wishing to be bound by theory, the second aspect of the present invention arises from the fact that other than the comonomer and the reaction temperature, a number of the variables which might affect the degassing process do not change, or the changes e.g. monomer concentration, will not have a significant effect on the degassing requirements.

Although not necessarily so limited, in general, the very simple relationships between the degassing rate required for polymers using the same comonomer but for reaction at different temperatures will generally apply as in the first aspect.

Thus, X2, X3 and X4 are usually at least 1% lower than X1 for each 1° C. increase in temperature between the start-point of the respective bands i.e. "b", "c" and "d" compared to "a" in Table 1a, 80° C., 90° C. and 100° C. compared to 70° C. in Table 1b.

Preferably, X2, X3 and X4 are no more than 3% lower than X1 for each 1° C. increase in temperature between the start-point of the respective bands and most preferably are lower by an amount of 2% to 3% for each 1° C. increase.

As mentioned in respect of the first aspect of the present invention, it would be possible in an overall campaign to determine degassing flow rates for every individual polymer to be produced based on the temperature and the comonomer to be used, However, this second aspect of the present invention takes advantage of the fact that, for practical operational purposes, it is generally more convenient to define temperature bands, for example of 10° C. or 5° C., where the purge rate is not changed for transitions between products produced within a particular temperature band, the purge rate only being changed when a transition occurs to a temperature in another band, or when the comonomer is changed.

Generally, the narrower the bands in this second aspect the more optimum is the degassing over a range of products, so a range of 5° C. or less is preferred for each band. As specific examples, the defined bands may be 70-<75° C., 75-<80° C., 80-<85° C., 85-<90° C., 90-<95° C. etc, although it will be readily apparent that other bands of width of 5° C. may be equally valid. Equally there is no necessity for the temperature bands to be a uniform range, e.g. 5° C., across the full operational window of polymer production. For example, a band of 5° C. may be used at "lower" temperatures, and a wider band, of e.g. 10° C., may be used at "higher temperatures". For "simplicity" the same bands are usually used for all comonomers, although again this is not strictly necessary.

The second aspect of the present invention provides a robust but relatively simple control system for ensuring that all polymers to be produced are adequately degassed. Compared to "conventional" processes where a single degassing flow rate is used for all polymers, significant reductions in purge gas flow rate are achieved for many polymers. The method is, however, much simpler than trying to define individual flow rates for all polymers to be produced during a campaign.

EXAMPLE

The following Example illustrates the method of the present invention.

All polymers are produced in a gas phase fluidised bed reactor using a Ziegler Natta catalyst. The reactor diameter is 4.5 m and a bed height of 16 m was used. The degassing process comprises three stages. The first stage is a flash column in which the pressure is released. No stripping gas is used in this stage. The second stage uses a fixed flow of recycle purge gas. The third stage uses nitrogen as purge gas.

The flow rate of nitrogen is varied in said third stage dependent on the polymer being produced. The flow rate is defined for a series of bands and dependent on the comonomer to be used as described above.

The results of a polymerisation campaign are shown in FIG. 1.

The initial polymer produced was an ethylene/1-butene copolymer produced at a temperature of approximately 108° C. A nitrogen flow rate of 730 kg/h was used.

The first transition was to production of an ethylene/1-hexene copolymer, also produced at a temperature of approximately 108° C. (there is a slight drift downwards in temperature). The nitrogen flow rate was increased to 1030 kg/h.

The second transition was an increase in temperature to approximately 110° C. without a change in comonomer to produce a different grade ethylene/1-hexene copolymer. In the present example, this is within the same temperature band as the previous product, and no change in flow rate is made.

Subsequently, a further temperature increase is made to approximately 113° C. to produce a further different grade ethylene/1-hexene copolymer. In this case, the new temperature is in the next temperature band, and the flow rate of nitrogen is reduced to 780 kg/h.

The temperature was then reduced back to approximately 108° C., again using 1-hexene as comonomer. Thus, the temperature is back within the same band as the earlier ethylene/1-hexene compolymers produced, and the nitrogen flow rate was increased back to 1030 kg/h.

Finally, whilst staying at 108° C. the comonomer was changed back to 1-butene.

This product is the same as the original product and correspondingly the nitrogen flow rate is changed back to the original value of 730 kg/h.

The invention claimed is:

1. A method for transitioning from a first process for production of a first polymer to a second process for the production of a second polymer during a polymerisation campaign in a polymerisation apparatus, said polymerisation apparatus comprising a reaction vessel and a degassing vessel, in which the respective first and second processes each comprise:
    (a) bringing a principal olefin and a comonomer into contact with a catalyst under gas phase polymerisation conditions in the reaction vessel to form the respective first or second polymer, wherein said first and second process utilise the same principal olefin but differ in at least one of (i) the comonomer used and (ii) the reaction temperature at which the polymer is produced, and
    (b) subsequently contacting the respective first or second polymer with a purge gas in the degassing vessel to remove unreacted monomers,
    wherein the method for transitioning comprises changing the flow rate of purge gas in the degassing vessel from a first rate, $X_1$, used for degassing of the first polymer to a second rate, $X_2$, used for degassing of the second polymer, the second rate being defined relative to the flow rate, $X_i$, and temperature, $T_i$, used for an earlier polymer produced during the campaign using the same comonomer as the second process, and the reaction temperature, $T_2$ in the second process, and wherein
    a. where $T_2$ is increased relative to $T_i$, $X_2$ is at least 1% lower than $X_i$ for each 1° C. increase in $T_2$ compared to $T_i$,
    b. where $T_2$ is decreased relative to $T_i$, $X_2$ is at least 1% higher than $X_i$ for each 1° C. decrease in $T_2$ compared to $T_i$, and
    c. where $T_2$ is equal to $T_i$, $X_2$ is at least equal to $X_i$.

2. The method according to claim 1 wherein $T_2$ is increased relative to $T_i$, and $X_2$ is no more than 3% lower than $X_i$ for each 1° C. increase in temperature in $T_2$ compared to $T_i$.

3. The method according to claim 1 wherein $T_2$ is decreased relative to $T_i$, and $X_2$ is increased by less than 10% compared to $X_i$ for each 1° C. decrease in temperature in $T_2$ compared to $T_i$.

4. The method according to claim 1 wherein $T_2$ is equal to $T_i$, and $X_2$ is less than 5% greater than $X_i$.

5. The method according to claim 1 wherein each polymer produced during the campaign will have a degassing flow rate defined based on its actual production temperature and the comonomer used, such that every change in reaction temperature results in a change in the flow rate in the degassing step to correspond to the required flow rate for the second polymer being transitioned to.

6. The method according to claim 1 wherein there are defined temperature bands and where the purge rate is not changed for transitions between products produced within a particular temperature band, the purge rate only being changed when a transition occurs to a temperature, $T_2$ in another band to that of $T_1$.

7. The method according to claim 1 in which the principal olefin is selected from ethylene and propylene and the comonomer olefin is selected from 1-butene, 1-hexene and 1-octene.

8. The method according to claim 1 wherein the purge gas is an inert gas or is recycle purge gas, or comprises a mixture thereof.

9. The method according to claim 1 wherein the same catalyst is used for production of the earlier polymer, the first polymer and second polymer.

10. A method for production of three or more polymers in a polymerisation apparatus, said polymerisation apparatus comprising a reaction vessel and a degassing vessel, and said method comprising:
    (a) producing a first polymer,
    (b) transitioning from production of said first polymer to production of a second polymer,
    (c) producing said second polymer,
    (d) transitioning from production of said second polymer to production of a third polymer,
    (e) producing said third polymer,
    (f) repeating said steps as required to transition to and produce any further polymers to be produced,
    each polymer being produced by bringing a principal olefin and a co-monomer into contact with a catalyst under gas phase polymerisation conditions in the reaction vessel to form the said polymer, and said polymer being subsequently contacted with a purge gas in the degassing vessel to remove unreacted monomers, wherein the production of all said polymers uses the same principal olefin but for each transition at least one of (i) the comonomer used and (ii) the reaction temperature at which the polymer is produced is changed, with the further proviso that in at least one transition the comonomer used is changed and in at least one transition the reaction temperature is changed, and wherein for each comonomer to be used, two or more bands covering a range of temperatures within the total range of temperature used to produce the polymers using said comonomer are defined, each of the three or more polymers to be produced being produced at a temperature which falls within one of the defined bands for the relevant comonomer and each band having associated with it a flow rate for purge gas in the degassing vessel, wherein, during production of each polymer to be produced, the flow rate of purge gas in the degassing vessel is at least equal to the flow rate associated with the band within which said polymer falls, and unless the transition is from one polymer to another polymer within the same band, during each transition the flow rate in the degassing vessel is changed to a flow rate at least equal to the flow rate associated with the band within which the polymer being transitioned to falls.

11. A method according to claim 10, wherein the bands are represented as follows:

| Temperature band | Comonomer | | |
|---|---|---|---|
| | A | B | C |
| a-<b °C. | X1 | Y1 | Z1 |
| b-<c °C. | X2 | Y2 | Z2 |
| c-<d °C. | X3 | Y3 | Z3 |
| d-<e °C. | X4 | Y4 | Z4 |
| Etc. | ... | ... | ... |

Where:

A, B and C represent different comonomers, a, b, c etc. represent temperatures, and X1, X2, Y1, Y2 etc, each represent a flow rate of purge gas in the degassing vessel for a polymer to be produced using the relevant comonomer and in the relevant temperature band, such that during production of each polymer the flow rate of purge gas in the degassing vessel is at least equal to the associated flow rate.

12. The method according to claim 1 wherein when $T_2$ is equal to $T_i$, $X_2$ is equal to $X_i$.

* * * * *